United States Patent [19]

Platte et al.

[11] Patent Number: 4,590,531
[45] Date of Patent: May 20, 1986

[54] SYSTEM FOR COMPENSATING SIGNAL INTERFERENCE IN A PCM AUDIO TRANSMISSION

[75] Inventors: Hans-Joachim Platte, Hemmingen; Walter Voessing, Wennigsen; Günter Oberjatzas; Ernst Schröder, both of Hanover, all of Fed. Rep. of Germany

[73] Assignee: Telefunken Fernseh und Rundfunk GmbH, Hanover, Fed. Rep. of Germany

[21] Appl. No.: 641,256

[22] Filed: Aug. 16, 1984

[30] Foreign Application Priority Data

Aug. 17, 1983 [DE] Fed. Rep. of Germany ....... 3329601

[51] Int. Cl.⁴ .............................................. G11B 5/09
[52] U.S. Cl. .................................................. 360/47
[58] Field of Search ............... 360/47; 455/63; 375/34

[56] References Cited

U.S. PATENT DOCUMENTS

| | | | |
|---|---|---|---|
| 3,761,903 | 9/1973 | Bird et al. | 360/47 |
| 3,883,891 | 5/1975 | Thompson et al. | 360/47 |
| 4,202,018 | 5/1980 | Stockham, Jr. | 360/47 |
| 4,328,580 | 5/1982 | Stockham et al. | 360/47 |

FOREIGN PATENT DOCUMENTS

| | | | |
|---|---|---|---|
| 85517 | 8/1983 | European Pat. Off. | 360/47 |
| 3050171 | 3/1982 | Fed. Rep. of Germany. | |
| 632362 | 9/1982 | Switzerland. | |

*Primary Examiner*—Vincent P. Canney
*Attorney, Agent, or Firm*—Spencer & Frank

[57] ABSTRACT

A pulse code modulated audio signal transmission system which compensates for signal interference in the pulse code modulated audio signal. The system includes a first device for receiving an audio signal and for converting the audio signal into a pulse code modulated audio signal, and a second device for receiving the audio signal and for producing an auxiliary signal corresponding to the audio signal but having a smaller bandwidth than the audio signal. A transmission circuit is connected to the first and second devices for receiving the pulse code modulated audio signal and the auxiliary signal and for producing an output signal which comprises the audio signal with portions of the audio signal which contain interference being substituted with corresponding portions of the auxiliary signal.

10 Claims, 10 Drawing Figures

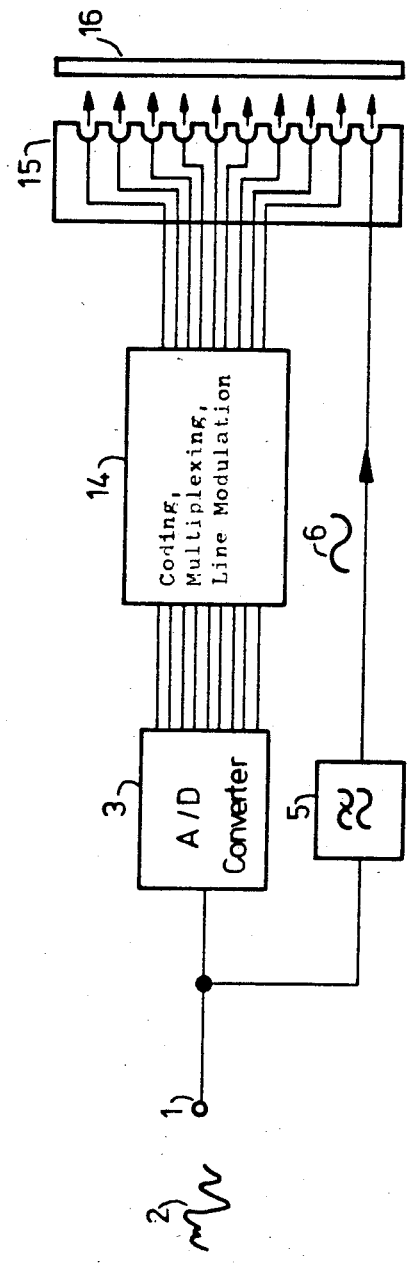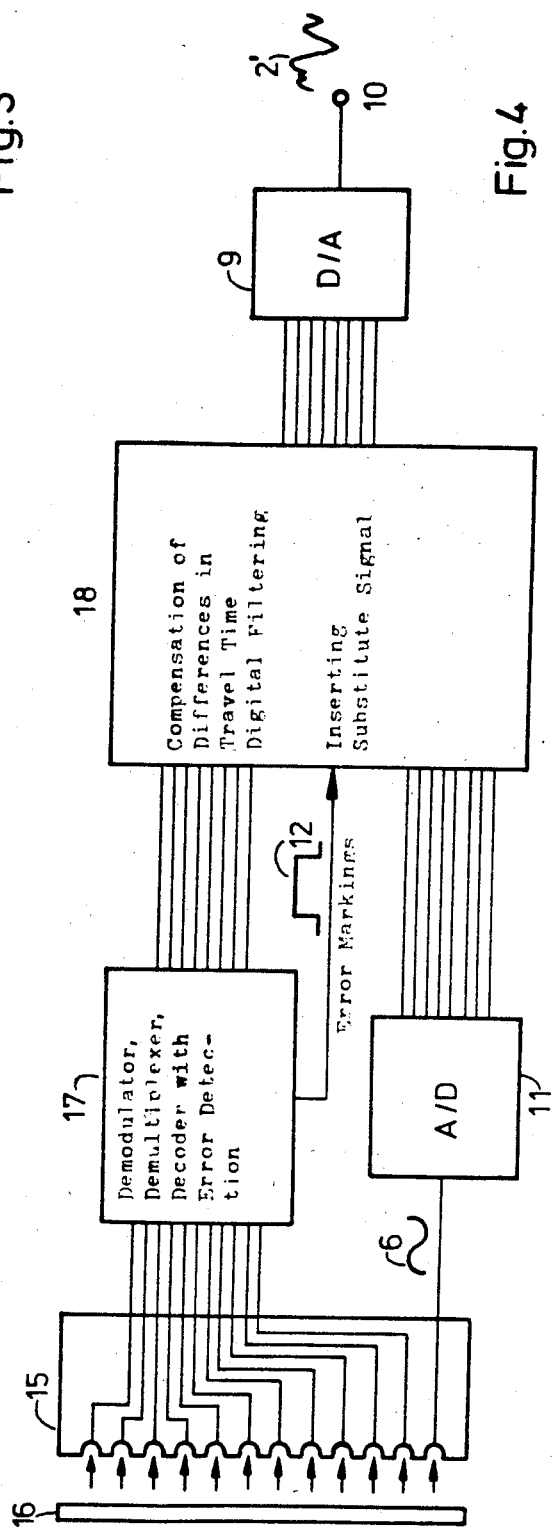

SYSTEM FOR COMPENSATING SIGNAL INTERFERENCE IN A PCM AUDIO TRANSMISSION

BACKGROUND OF THE INVENTION

The invention relates to a pulse code modulated (PCM) audio signal transmission system which compensates for signal interference in the PCM signal.

During the transmission of a PCM audio signal, statistically distributed interference occurs which becomes more or less audible during audio playback. When recording a PCM audio signal by means of a magnetic tape recorder, such interference is produced essentially by dropouts on the magnetic tape.

In connection with television signals, it is known to add the signal of the preceding line as a substitute signal during the duration of a dropout. This solution is based on the acceptable assumption that the signals of horizontal lines that are successive in time have essentially the same informational contents. Such a solution is not possible for an audio signal because no correlation exists between audio signal sections of successive time periods.

Circuits are also known with which it is possible to correct and/or cover-up errors occurring during recording in the digital recording or transmission path. Such error correction systems or error cover-up algorithms fail, however, if the interference exceeds a defined time period. For such a case, referred to as a "digital catastrophe", it is known to provide an electronically controlled muting circuit which blanks out the output signal for the duration of an uncorrectable error. Such a muting circuit serves essentially only to protect the subsequent electroacoustic components and the listener's hearing because a digital transmission based on interference could produce output signals of an extremely high amplitude. The actual error cannot be corrected by the muting circuit. Transmission or recording at hi-fi quality can no longer be realized with a temporarily operating muting circuit.

SUMMARY OF THE INVENTION

It is an object of the present invention to provide a system for compensating for signal interference in a PCM audio transmission which system operates without audible interference even if the PCM audio signal can no longer be corrected in itself.

The above and other objects are accomplished according to the invention wherein a pulse code modulated audio signal transmission system is provided which compensates for signal interference in the pulse code modulated audio signal. The system includes first means for receiving an audio signal and for converting the audio signal into a pulse code modulated audio signal; second means for receiving the audio signal and for producing an auxiliary signal corresponding to the audio signal but having a smaller bandwidth than the audio signal; and transmitting means connected to the first and second means for receiving the pulse code modulated audio signal and the auxiliary signal and for producing an output signal which comprises the audio signal with portions of the audio signal which contain interference being substituted with corresponding portions of the auxiliary signal.

The present invention is based on the following realization. If the auxiliary signal is recorded with an offset in time, space or frequency compared to the PCM audio signal, the probability of interference occurring in both signals at the same point in time becomes very low. Therefore, the auxiliary signal can be inserted into the PCM audio signal during the time of actual interference as a useful estimated function so as to eliminate the interference. In principle, the auxiliary signal can be transmitted or recorded as an analog signal of low bandwidth or a digital signal with a low data rate, e.g. coded in DPCM (differential pulse code modulation) or ADPCM (adaptive differential pulse code modulation). These methods are described in the book by A. V. Oppenheim, "Applications of Digital Signal Processing" Prentice-Hall, Inc., 1978.

All approximation errors created during the derivation of the substitute signal and during its most economically possible transmission are acceptable as long as an insertion of the substitute signal at the correct time into time periods of interference of the hi-fi PCM audio signal result in less noticeable signal interference than the muting circuit solution of prior art PCM audio systems.

The solution provided by the present invention makes it possible to bridge even longer interruptions. Uncorrectable errors of the PCM audio signal no longer lead to complete blanking out of the signal (muting) and therefore the user's tolerance threshold with respect to errors and the wear of record carriers produced by the PCM technology becomes greater. Temporary changes to the substitute signal occurring more frequently with increasing wear indicate a gradually more noticeable degradation of the PCM audio signal. Utilization of the present invention allows a record carrier to be used longer without unbearable interference during playback. A further advantage is that possibly the transmitted or recorded analog auxiliary signal, e.g. a low-frequency audio signal having a bandwidth of a few kHz, can be used by itself for playback. This makes it possible to play the record carrier even on simpler playback devices, e.g. on a portable device or an automobile tape player. If the auxiliary signal is recorded in a suitable manner, it can always be used for playback by itself if the advantage of the simpler playback device is valued higher than the disadvantage of reduced quality of the auxiliary signal.

BRIEF DESCRIPTION OF THE DRAWINGS

FIG. 3 is a block circuit diagram of an alternative embodiment of the recording portion of the block circuit diagram of FIG. 1.

FIG. 4 is a block circuit diagram of an alternative embodiment of the playback portion of the block circuit diagram of FIG. 1.

DESCRIPTION OF THE PREFERRED EMBODIMENTS

Figure 1:
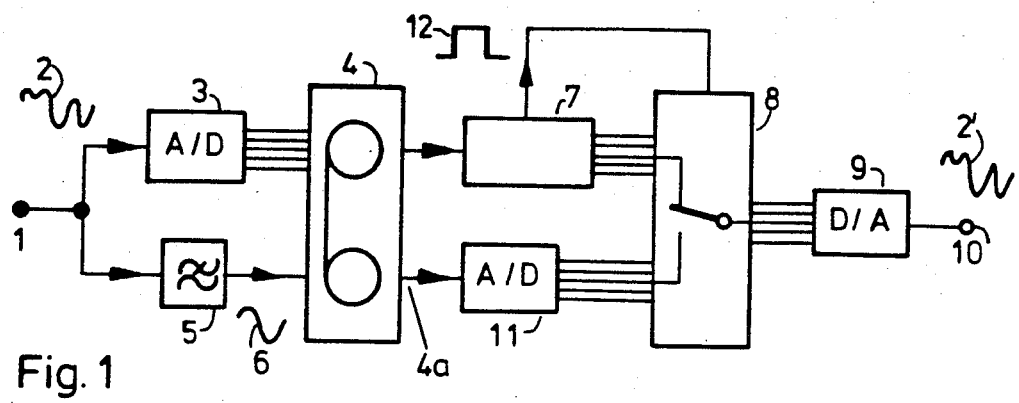
FIG. 1 is a block circuit diagram of a recording and playback system according to the invention.

In FIG. 1, an analog low frequency (LF) audio signal 2 with the full LF bandwidth of 20 kHz is present at terminal 1. This signal is converted by an analog to digital (A/D) converter 3 into a PCM audio signal and is recorded on a magnetic tape recorder 4. A lowpass filter 5, which has an upper cutoff frequency preferably in the range of 2-6 kHz, is connected to terminal 1 for receiving audio signal 2 to produce an auxiliary signal 6 of reduced bandwidth which is likewise recorded by magnetic tape recorder 4.

During playback, the picked-up PCM audio signal travels through circuit 7 and switch 8 to digital to analog (D/A) converter 9, which furnishes the analog audio signal 2' at terminal 10. The recorded analog auxiliary signal 6 is fed, via A/D converter 11, to the other input of switch 8.

The PCM-signal can be encoded with an error-detecting or error-correcting code as explained in:

AES Preprint No. 1991, March 1983, T. T. Doi "Error Correction for Digital Audio Recording". The decoding is done in circuit 7 by a Signal processor e.g. a general purpose Microprocessor like Intel 8086 or Motorola MC 68000 or a special programmable signal processor like NEC/μPD7720.

If interference occurs in the digital PCM audio signal at the input of circuit 7, this is detected by circuit 7. During the interference, pulse 12 is generated which actuates switch 8 for inserting the digitized auxiliary signal at the output of A/D converter 11 into that portion of the PCM audio signal containing the interference.

Figure 2A:
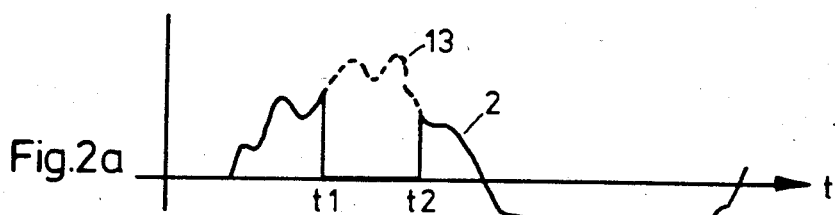
FIGS. 2a to 2d are diagrams of curves corresponding to signals occurring in the operation of the system of FIG. 1.
Figure 2B:
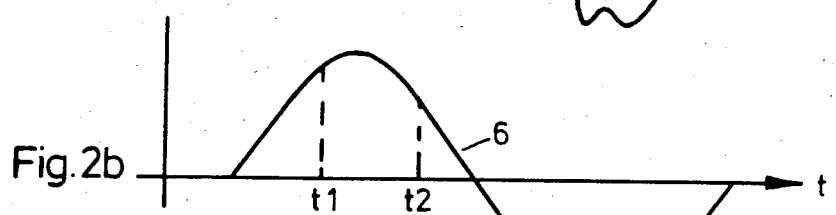
Figure 2C:
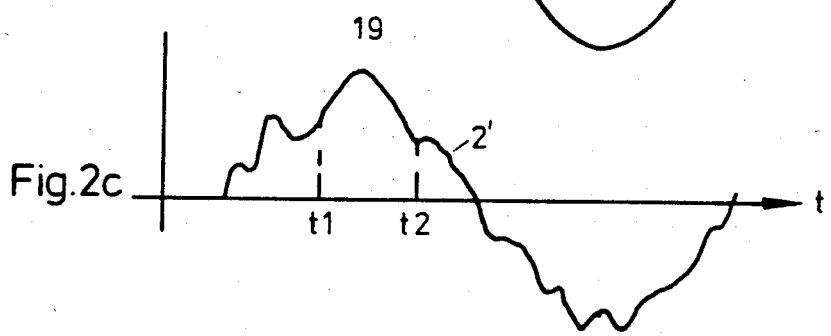
Figure 2D:
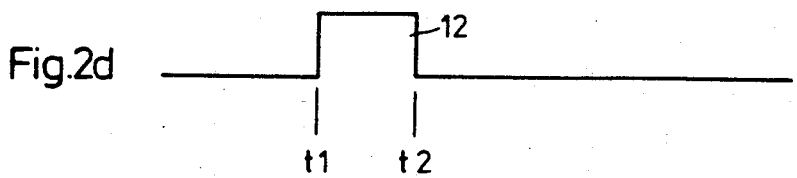

In FIGS. 2a to 2d it is assumed that during playback in FIG. 1, the audio signal 2 is interfered with from time $t_1$ to $t_2$ due to interference in the PCM audio signal coming from tape recorder 4, i.e. in FIG. 2a the portion 13 of the signal shown in dashed lines is missing. A muting circuit would normally adjust the magnitude of audio signal 2 to zero during this time producing an unacceptable signal quality during playback. FIG. 2b shows the narrowband analog auxiliary signal 6 which, according to the invention, is likewise picked up from tape recorder 4 and inserted as a substitute signal 19 (FIG. 2c) from time $t_1$ to $t_2$. This produces the corrected audio signal 2' shown in FIG. 2c which, rather than being interrupted from time $t_1$ to $t_2$, is matched to the missing signal 13 with sufficient approximation. In principle, the insertion of the substitute signal 19 into the PCM audio signal 2' during interference may be effected in the digital signal path as shown in FIG. 1 or in an analog signal path as shown in FIG. 3. The insertion of the substitute signal can be accomplished by a switch or a plurality of switches as shown in FIG. 1 or by any circuit producing a fade-in and fadeout for analogoue signals, e.g. a ganged portentiometer.

In FIG. 3, the PCM audio signal at the output of A/D converter 3 is processed in circuit 14 in such a manner that it can be recorded by a multiple-track magnetic recording head 15 on a plurality of parallel tracks on magnetic tape 16.

The plurality of tracks has the following purpose. In a PCM audio signal having a bit rate in the order of magnitude from $0.5 \cdot 10^6$ to $3 \cdot 10^6$ bits/sec and with a tape speed sufficient for extended play, the recorded wavelength in one track becomes too small, i.e. the recording bandwidth of one track is no longer sufficient for recording a PCM audio signal with a high bit rate. Therefore, the recording is distributed to a plurality of tracks, for example 16. With the number of tracks n equal to 16, the bit rate required for one track is likewise divided by n so that the signal can be recorded on each track with a lower bit rate.

The analog auxiliary signal 6 obtained from lowpass filter 5 is additionally recorded as an analog signal by multiple-track head 15 on one of the tracks of magnetic tape 16. Thus, the auxiliary signal 6 is here recorded on magnetic tape 16 offset in space so that the simultaneous occurrence of interference in the recorded PCM audio signal and in the auxiliary signal 6 is improbable. In order to practically exclude simultaneous interference in both signals, the recorded PCM audio signal and auxiliary signal 6 may also be recorded with a time or frequency offset. Time offset is possible with every video-tape recorder with helical scan used for PCM audio recording with the EIAJ format, e.g. the Sony SL 2000 plus PCM-F1 due to the different position of the magnetic heads for helical scan and for longitudinal scan for the usual audio recording on video taperecorders. Frequency offset can achieved similar to the frequency offset in the so-called color-under system in video taperecorders. See, for example, German Auslegeschrift No. 18 08 439.

FIG. 4 shows a playback circuit that may be used with the recording circuit of FIG. 3. Circuit 17 essentially performs the function of circuit 7 of FIG. 1 and circuit 18 performs the function of switch 8 of FIG. 1. Among other things, circuit 18 establishes the correct time position between the PCM audio signal from circuit 17 and the substitute signal from A/D converter 11, if both signals are recorded with a time offset or differences in travel time exist for other reasons. Circuits 14,17,18 are digital signal processors e.g. a general purpose Microprocessor like Intel 8086 or Motorola MC 68000 or a special programmable signal processor like NEC μPD 7720.

Figure 5:
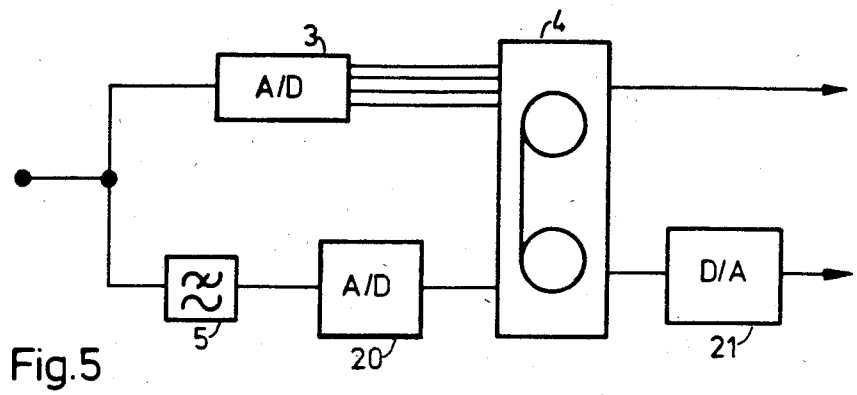
FIG. 5 shows a block diagram according to the invention when the auxiliary signal is recorded in digital format.

The auxiliary signal can also be recorded in digital format. This is shown in FIG. 5. In addition to the block diagram of FIG. 1 there are inserted into the input resp. output lines of the recorder 4 for the auxiliary signal analog to digital (20) or digital to analog (21) converters.

Auxiliaray signal 6 may also may be recorded on magnetic tape 16 by means of an additional head which extends over several or all of the tracks of the PCM audio signal.

Figure 7:
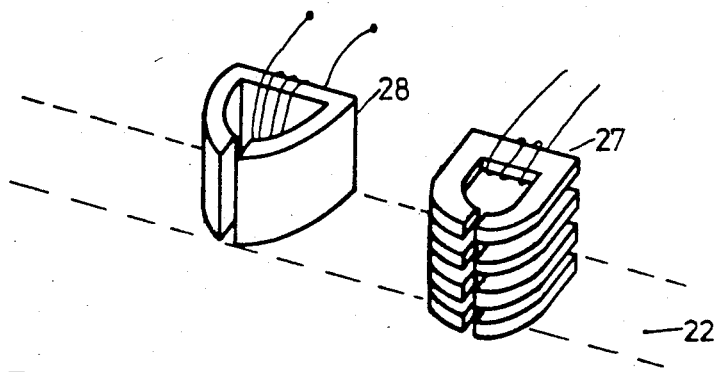
FIG. 7 shows an embodiment of the invention using a multiple-track magnetic head for the PCM signal and a single track head with greater track width for the auxiliary signal.

This is shown in FIG. 7, where a multiple track head 27 for the digital PCM signal and another head 28 with greater track width for the auxiliary signal are used to magnetize the tape 22.

Figure 6:
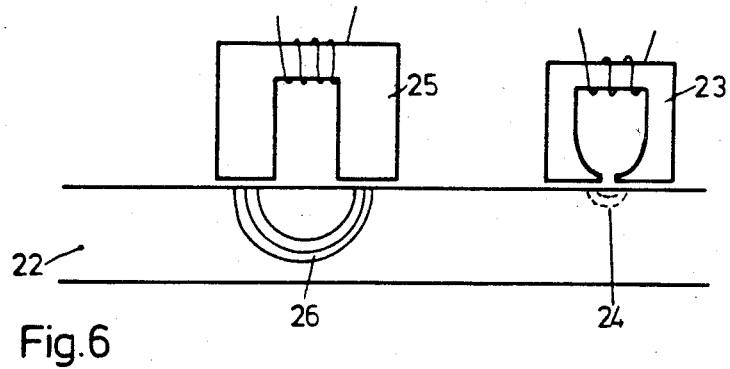
FIG. 6 shows an embodiment of the invention using magnetic heads with different gap width.

The PCM audio signal and the auxiliary signal 6 may also be recorded on the same tracks of the magnetic tape but with different penetration depths. Such a recording is possible with heads having different gap widths. This is shown in FIG. 6. A magnetic head 23 having a small gap width gives a lower penetration depth 24 into the magnetic coating 22 compared to the penetration 26 of the magnetic coating produced by a magnetic recording head 25 having a large gap width.

The auxiliary signal can be designed to require a smaller portion of the memory medium than the pulse code modulated audio signal by using a smaller sampling frequency and/or a shorter wordlength for the auxiliary signal.

For applications requiring only a moderate signal quality it is possible to use only the auxiliary signal as output of the transmission system by omitting blocks 7,8,9 and 11 from FIG. 1 and using only the signal from the appropriate output 4a of block 4.

It will be understood that the above description of the present invention is susceptible to various moddifications, changes and adaptations, and the same are intended to be comprehended within the meaning and range of equivalents of the appended claims.

What is claimed is:

1. A pulse code modulated audio signal transmission system which compensates for signal interference in the pulse code modulated audio signal comprising:

first means for receiving an audio signal and for converting the audio signal into a pulse code modulated audio signal;

second means, including a low pass filter, for receiving the audio signal and for producing an auxiliary signal corresponding to the audio signal but having a smaller bandwidth than the audio signal; and transmission means connected to said first and second means for receiving the pulse code modulated audio signal and the auxiliary signal, said transmission means including means for converting the auxiliary signal into a DPCM auxiliary signal, said transmission means producing an output signal which comprises the audio signal with portions of the audio signal which contain interference being substituted with corresponding portions of the DPCM auxiliary signal.

2. A system as defined in claim 1, wherein said second means produces the auxiliary signal in the form of an analog auxiliary signal.

3. A system as defined in claim 1, wherein said transmission means includes fade-out and fade-in means for effecting a smooth transition from the pulse code modulated audio signal to each of the DPCM auxiliary signal portions and from each of the DPCM auxiliary signal portions to the pulse code modulated audio signal.

4. A system as defined in claim 1, wherein said transmission means includes a recording means for recording the pulse code modulated audio signal and the auxiliary signal.

5. A system as defined in claim 4, wherein said second means produces the auxiliary signal in the form of an analog signal and said recording means includes a magnetic tape having a plurality of parallel tracks and a fixed multipletrack head means for recording the pulse code modulated audio signal on said plurality of parallel tracks and simultaneously recording the analog auxiliary signal superimposed over the pulse code modulated audio signal over the width of said plurality of tracks.

6. A system as defined in claim 5, wherein said fixed multiple-track head means includes a first magnetic head means having a first track width for recording and playback of the pulse code modulated audio signal and a second magnetic head means having a track width greater than the first track width for recording and playback of the auxiliary signal.

7. A system as defined in claim 4, wherein said recording means is arranged for recording the pulse code modulated audio signal and the auxiliary signal so that such signals are offset with respect to each other in one of time, frequency and space.

8. A system as defined in claim 4, wherein said transmission means includes means for audio playback of only the auxiliary signal.

9. A system as defined in claim 4, wherein said recording means includes a magnetic tape and means for recording the pulse code modulated audio signal and the auxiliary signal at different penetration depths of said tape.

10. A system as defined in claim 4, wherein said recording means has a memory medium and said second means produces the auxiliary signal so that the auxiliary signal requires a smaller portion of said medium than the pulse code modulated audio signal.

* * * * *